(12) United States Patent
Koops et al.

(10) Patent No.: US 6,528,807 B1
(45) Date of Patent: Mar. 4, 2003

(54) METHOD FOR APPLYING OR REMOVING MATERIAL

(76) Inventors: Hans Wilfried Peter Koops, Ernst-Ludwig-Strasse 16, D-64372 Ober-Ramstadt (DE); Johannes Kretz, Tattenbachstrasse 1, D-80538 Munich (DE); Hubert Brueckl, Stennerstrasse 91, D-33613 Bielefeld (DE)

( * ) Notice: Subject to any disclaimer, the term of this patent is extended or adjusted under 35 U.S.C. 154(b) by 0 days.

(21) Appl. No.: 09/485,210
(22) PCT Filed: Jul. 15, 1998
(86) PCT No.: PCT/EP98/04403
§ 371 (c)(1), (2), (4) Date: Feb. 4, 2000
(87) PCT Pub. No.: WO99/08099
PCT Pub. Date: Feb. 18, 1999

(30) Foreign Application Priority Data

Aug. 5, 1997 (DE) .......................................... 197 33 795

(51) Int. Cl.$^7$ .............................................. H01J 37/305
(52) U.S. Cl. ...................... 250/492.3; 250/306; 250/307
(58) Field of Search ............................. 250/492.3, 310, 250/306, 311, 307

(56) References Cited

U.S. PATENT DOCUMENTS

| | | | | |
|---|---|---|---|---|
| 5,126,574 A | * | 6/1992 | Gallagher | 250/423 F |
| 5,138,174 A | * | 8/1992 | Tang | 250/492.2 |
| 5,227,626 A | * | 7/1993 | Okada et al. | 250/234 |
| 5,294,465 A | * | 3/1994 | Gallagher | 427/248.1 |
| 5,416,331 A | | 5/1995 | Ichikawa et al. | |
| 5,440,122 A | | 8/1995 | Yasutake | |

FOREIGN PATENT DOCUMENTS

| | | |
|---|---|---|
| EP | 0 376 045 | 12/1989 |
| EP | 0 736 746 | 1/1996 |
| JP | 05288714 | 11/1993 |
| JP | 6297252 | 10/1994 |

OTHER PUBLICATIONS

Matsumoto et al., "Application of Scanning Tunneling Microscopy Nanofabrication Process to Single Electron Transistor", Mar./Apr. (1996), pp. 1331–1335, J. Vac. Sci. Technology.

Dobisz et al., "Sub–30 Nm Lithography in a Negatie Electron Beam Resist with a Vacuum Scanning Tunneling Microscope", Jun. 3, 1991, pp. 2526–2528, Appl. Phys. Lett.

Koops et al., "Novel Lithography and Signal Processing with Water Vapor Ions", pp. Jul./Aug. 1997, pp. 1369–1372, J. Vac. Sci. Technology.

(List continued on next page.)

*Primary Examiner*—John R. Lee
*Assistant Examiner*—Anthony Quash

(57) ABSTRACT

A process which allows effective application or removal of materials to and from substrates using a scanning probe microscope operated at atmospheric pressure.

The substrate is placed in a trough, located on the x-y table of a scanning probe microscope (SXM), and this trough is filled with a liquid and/or gaseous medium up to a level such that the top side of the substrate is covered with a thin layer, composed of at least one monolayer of the medium. For depositing a structured precipitate from the medium or for structuring etching of the surface of the substrate, the microtip of the SXM is then dipped into the layer and supplied with an electric voltage or with voltage pulses.

The process can be used for applying or removing materials to and from substrates. The process is also usable for characterization of the geometry and for restoration or the production of microtips of SXM cantilevers, as well as for storing information, for reading information and for erasing information.

19 Claims, 7 Drawing Sheets

OTHER PUBLICATIONS

Dobisz et al., "Simulation of Scanning Tunneling Microscope Interaction with Resists", Jun. 17, 1996, pp. 3653–3655, Appl. Phys. Lett.

A. Anway, "Field Ionization of Water", Mar. 1, 1969, pp. 2012–2021, The Journal of Chemical Physics, vol. 50. No. 5.

R. Gomer, "Possible Mechanisms of Atom Transfer in Scanning Tunneling Microscopy", Jul. 4, 1986, IBM J. Res. Develop. vol. 30 No. 4.

Minne et al., "Atomic Force Microscope Lithography using Amorphous Silicon as a Resist and Advances in Parallel Operation", May/Jun. 1995, pp. 1380–1385, J. Vac. Sci. Technology.

McCord et al., "Direct Deposition of 10–nm Metallic Features with the Scanning Tunneling Microscope", Nov./Dec. 1998, pp. 1877–1880, J. Vac. Sci. Technology.

Ehrichs et al, "Four–probe Resistance Measurements of Nickel Wires Written with a Scanning Tunneling Microscope/Scanning Electron Microscope System", 1992, pp. 1438–1442, Elsevier Science Publishers B.V.

IBM Technology Disclosure Bulletin, "In Situ Sharpening of Atomic Force Microscope Tips", Feb. 2, 1995, p. 637, vol. 38. No. 2.

Lee et al., "Submicron Si Trench Profiling with an Electron–beam Fabricated Atomic Force Microscope Tip", Nov./Dec. 1991, J. Vac. Sci. Technology, pp. 3562–3568.

H.J. Gao et al. "A new type of organometallic system for high density data storage by scanning tunneling microscopy", Chemical Physics Letters, Jul. 4, 1997, pp. 459–462.

* cited by examiner

METHOD FOR APPLYING OR REMOVING MATERIAL

FIELD OF THE INVENTION

The present invention relates to a process for applying or removing materials to and from substrates using a scanning probe microscope (SXM), operated at atmospheric pressure. The SXM which may be a scanning tunneling microscope (STM), a scanning force microscope (SFM) or a scanning near-field microscope (SNOM).

RELATED TECHNOLOGY

It is known to use scanning tunneling microscopes for lithography. In this case, existing resist layers or metal surfaces in air are illuminated by ions or electrons or are oxidized, and fine structures are thus produced (Matsumoto, M. Ishii, K. Segawa: J. Vac. Sci. Technol. Vol. 14(2), 1331 (1996); E. A. Dobisz, C. R. K. Marrian: Appl. Phys. Lett. 58(22), 2526 (1991)). When there is sufficient water content in the ambient air, that is to say, given a humidity of more than 15%, and depending on the polarity of the tip, the illumination is effected with hydronium or hydroxyl ions (H. W. P. Koops, E. A. Dobisz, J. Urban: J. Vac. Sci. Technol. Vol. 15(4), 1369 (1997); E. A. Dobisz, H. W. P. Koops, F. K. Perkins: Appl. Phys. Lett. 68(22), 3653 (1996); A. R. Anway, Field Ionization of Water, The Journal of Chemical Physics, Vol.50, (1969) 2012–2021). In dry ambient air, illumination with electrons can be achieved.

It is also known to use scanning tunneling microscopes for applying material to a substrate. In this case, atoms of the substrate are displaced on the substrate, or the material is applied by transferring probe material by field evaporation (R. Gomer, IBM J. Res. Develop. 30, 428 (1986)).

Also known is to use scanning tunneling microscopes for high-resolution structuring processes and for information storage processes (S. C. Minne, Ph. Flueckinger, H. T. Soh, C. F. Quate: J. Vac. Sci. Technol. Vol. 13, 1380 (1995)).

It is also known to operate scanning tunneling microscopes for deposition lithography under vacuum conditions. In this case, material is supplied from a Knudsen cell, i.e., a reservoir with constriction of the delivery through a cannula or a nozzle (M. A. McCord, D. P. Kern, T. H. P. Chang: J. Vac. Sci. Technol. Vol. 6, 1877 (1988); E. E. Ehrichs, W. F. Smith, A. L . DeLozanne: Ultramicroscopy 42–44, 1438 (1992)). Organometallic compounds and substrates with unprepared surfaces are used.

Furthermore, it is known to carry out the process of electrolysis with an STM or SFM (JP 06 297252 A, JP 05 288714 A). In so doing, the ions contained in a liquid electrolyte are fixed by the electric field to a sample placed in the electrolyte.

These prior processes suffer from a number of disadvantages. It is particularly disadvantageous that it is necessary to work under vacuum conditions, which necessitates high expenditure in terms of equipment and time. Also disadvantageous is the fact that the conductivity of the deposits is usually inadequate because of the great carbon content. Since the known procedure is a serial process, the process is a relatively slow one. Furthermore, only small areas, typically 100 $\mu$m×100 $\mu$m at most, are writable. The high degree of probe wear is also disadvantageous.

SUMMARY OF THE INVENTION

An object of the present invention is to provide a method which allows effective application or removal of materials to and from substrates using a scanning probe microscope operated at atmospheric pressure.

In the method according to the present invention the substrate is placed in a trough, located on the x-y table, of a scanning probe microscope (SXM), which may be a scanning tunneling microscope, a scanning force microscope or a scanning near-field microscope, and the trough is filled with a liquid and/or gaseous medium up to a level such that the top side of the substrate is covered with a thin layer made of at least one monolayer of the medium. For depositing a structured precipitate from the medium or for the structuring etching of the substrate surface, the microtip of the SXM is then dipped into the layer and supplied with an electric voltage or with voltage pulses.

According to the invention, organometallic or other inorganic and organic compounds are used as the liquid and/or gaseous medium.

The invention present provides for supplying the medium in a quantitatively controlled manner. This may expediently be carried out with the use of weight and density differences existing between the ambient air and the medium, or with the assistance of a pump and controlled valve.

In doing this, the air in the trough will form a lower layer in response to the feeding of the gaseous medium which has a greater molecular weight than the air.

A thermoelectric sensor array or a reflection interferometer, composed of a light source, beam guide, line detector and evaluation electronics, or a total reflector with linear detector may expediently be used for monitoring the level of the medium.

According to the present invention, the medium may be changed during the production of the structured precipitate or during the structuring etching.

The etching products produced during the structuring etch removal are expediently transported away from the surface of the substrate by a rinsing medium.

For the application or removal of larger structure fields and for the three-dimensional construction of nanostructures with the SXM, according to the invention, one or more SXM probe cantilevers having a plurality of microtips may be used, the simultaneous use of all the microtips being ensured by a resistor built into each microtip or by active current control of the individual microtip.

When an SXM probe cantilever having a plurality of microtips is employed, use is also made of a test tip which is utilized as a positioning guide for this SXM probe cantilever during the application or removal of the material, for observation of larger structure fields and/or for three-dimensional processing of nanostructures.

According to the present invention, $Me_2Au(tfac)$ (dimethylgold trifluoroacetylacetonate), $Me_2Au(hfac)$ (dimethylgold hexafluoroacetylacetonate), $Me_2Au(acac)$ (dimethylgold acetylacetonate), $CpPt (CH_3)_3$ (cyclopentadienyl platinum trimethyl), $Mo(CO)_6$ (molybdenum hexacarbonyl), $Cu(hfac)_2$ (copper dihexafluoroacetylacetonate) may be used as the organometallic compound.

The present invention provides for the use of $TiI_4$ (titaniumiodite) or $TiCl_4$ (titaniumchloride) as the inorganic compound.

In the case of etch removal, $XeF_2$ (xenondifluoride), $TiI_4$ (titaniumiodite), $TiCl_4$ (titaniumchloride), $WF_6$ (tungstenhexafluoride) or other highly fluorinated or halogenated compounds may be used as the medium.

The present invention also relates to the use of the method according to the present invention for characterization of the geometry and restoration or production of microtips of SXM cantilevers, a tip that is electrically contacted to a conductor track being arranged in the trough on a substrate, and with its aid the geometry of the microtip being scanned by scanning microscopy, or with its aid, restoration or production of a microtip being carried out by supplying an electric voltage or voltage pulses to the contacted tip in order to deposit a precipitate from the medium onto the SXM probe cantilever.

To this end, the polarity of the bias voltage of the SXM, used when depositing a precipitate on the substrate or when etching the substrate, is simply reversed. This results in a material application or an etching of the microtip of the SXM probe cantilever. The polarity of the bias voltage of the SXM can subsequently be reversed again, to then continue to deposit or etch on the substrate.

The present invention also relates to the use of the method according to the present invention to store information, to read information and to erase information, where using the process, molecules or molecular clusters which are suitable as information carriers are applied to the substrates in order to store information, are detected in order to read information, and are removed or restructured in order to erase information.

In this case, according to the present invention, a plurality of tips may be used, repaired or else cleaned in the same way, but also in a mutually independent way.

In the method according to the present invention, individual gas atoms adsorbed at the surface of the substrate or of the microtip of the SXM are decomposed, caused by the use of the gaseous medium. A portion of them, and specifically metal atoms having carbon residues, are deposited on the surface of the substrate or of the microtip, or an etching of the substrate or of the microtip is carried out. It is virtually about a CVD process (chemical vapor deposition process), while dispensing with the vacuum necessary for the customary CVD by creating a local precursor atmosphere utilizing the particular material property of the precursor (high vapor pressure, greater density than air).

In contrast, in the electrolysis process of Japanese Patent Document Nos. JP 06 297252 A and JP 05 288714 A mentioned above, using an STM or SFM, work is done with a liquid medium, namely, an electrolyte. There a completely different process principle than for the CVD of the present invention is employed. While in the case of the electrolysis, the ions contained in the electrolyte are fixed by the electrical field to the substrate, in the method according to the present invention, a deposition induced by electron beam or ion beam is carried out.

The method according to the present invention has the particular distinction that it is not necessary to work under costly vacuum conditions. It is also advantageous that highly conductive deposits can be used, and that by rapid changing of the precursors, different processes such as deposition and etching can be carried out in a simple manner one after the other. Another advantage is that the probes which become worn when the process is being carried out can be regenerated again using the same process.

BRIEF DESCRIPTION OF THE DRAWING

The present invention is explained in more detail below with reference to exemplary embodiments. The following schematic representations are shown in the associated drawing.

DETAILED DESCRIPTION

Figure 1:
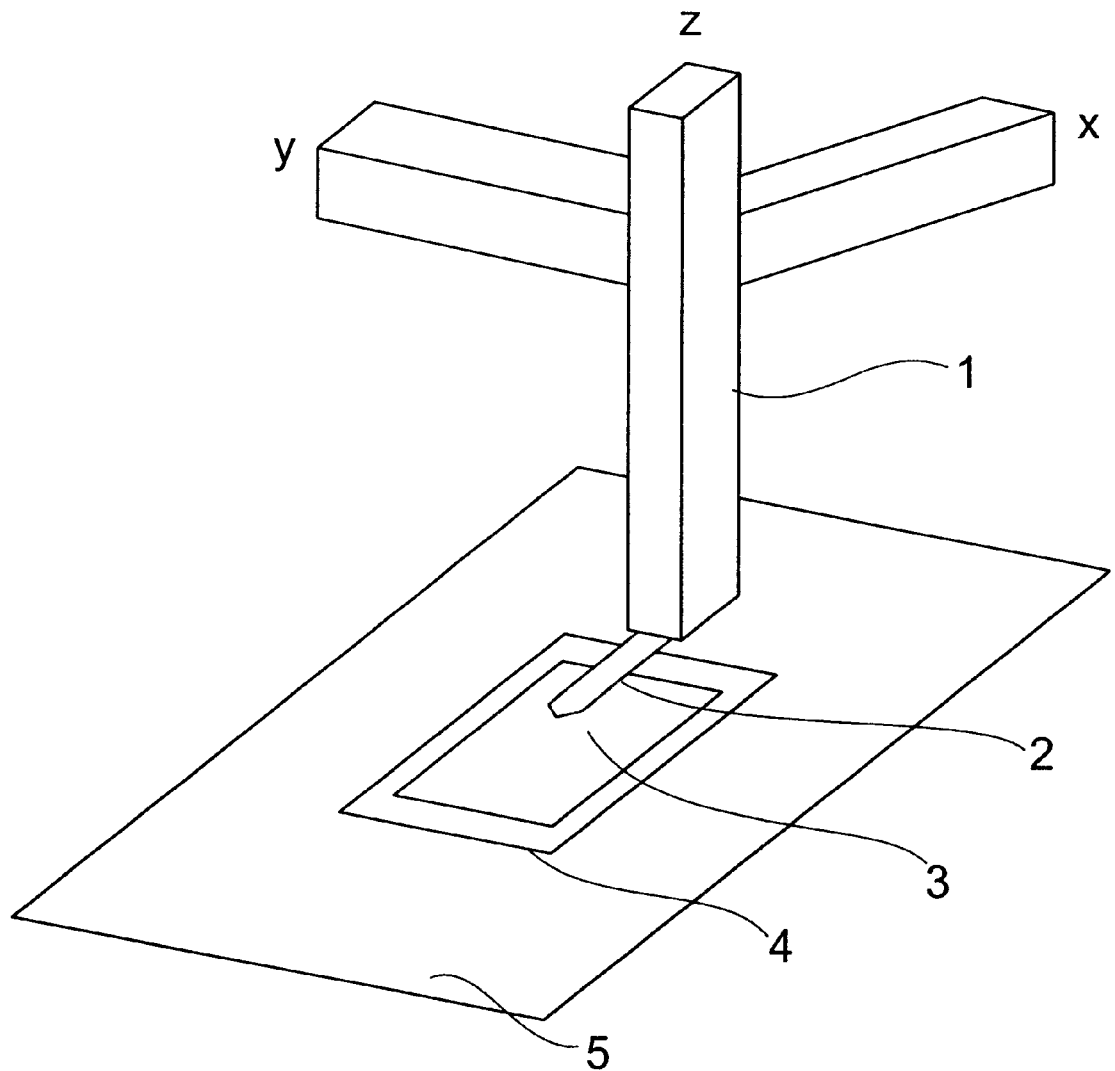
FIG. 1 shows the working arrangement in the case of a conventional scanning tunneling microscope.

The working arrangement, shown in FIG. 1, of a conventional scanning tunneling microscope that is operated at atmospheric pressure, has a probe 1 which can be moved in the x, y and z directions by three piezo motors and which, at its lower end, bears one or more cantilevers 2 having one or more microtips with which it is possible to scan a substrate 3 supported on a substrate holder 4. Substrate holder 4 is fastened on x-y table 5 that is able to move in the x-y direction.

A scanning tunneling microscope of this type is controlled by signal electronics (not shown in the drawing) with an image-memory, and image-reproduction and image-processing systems, as well as with a tip movement system and a sample movement system. The electronics additionally have one or more channels with which the microtips can be guided in accordance with a computer-generated pattern, and various constant or time-variable and pulsed voltages with amplitude and duration tailored to the process can be applied to the various microtips for imaging, coating or etching the substrate.

Figure 2:
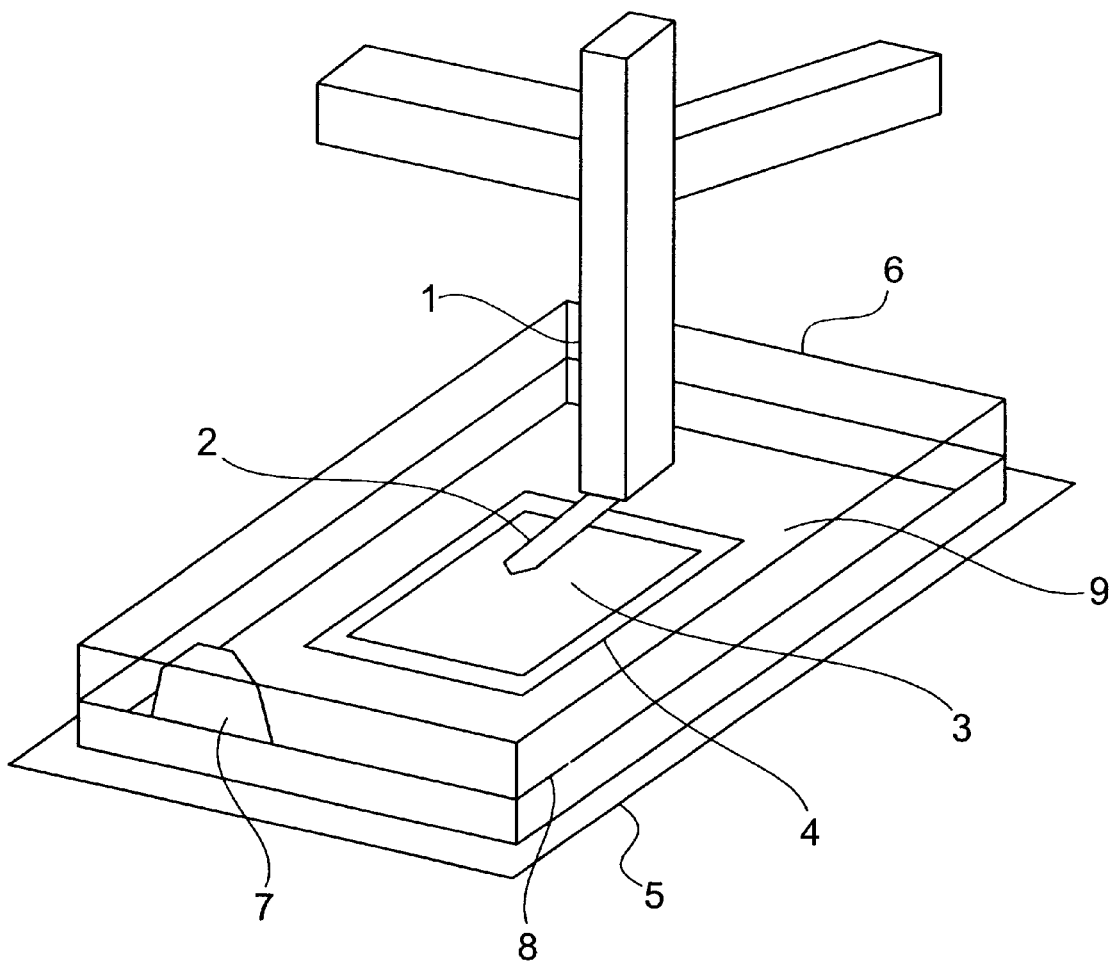
FIG. 2 shows a basic working arrangement for implementing the method according to the present invention, using a scanning probe microscope.

In the working arrangement shown in FIG. 2 for carrying out the process of the present invention, substrate 3 is located on substrate holder 4 in a trough 6 that is fastened on x-y table 5 of a scanning probe microscope. Dimethylgold acetylacetonate, which is composed of heavy organometallic molecules with a molecular weight of 380 and has a low vapor pressure of 40 mTorr, is introduced at atmospheric pressure into trough 6 as medium 7. The heavy vapor 9 of medium 7 which forms thereby displaces the air (molecular weight $O_2$=32) at the bottom of trough 6 and, in the course of time, coats the bottom of trough 6 to a level 8 at which a few monolayers of vapor 9 cover substrate 3. The microtip of cantilever 2, with which water ions are emitted, dips into this layer over substrate 3. The vapor molecules adsorbed on the surface of substrate 3 are broken up by the impact of the ions and, in the case of deposition, a lasting deposit is formed on substrate 3.

In the case of etching, an etching product is created which, through suitable selection of an etching vapor component, is as gaseous as possible so that it can be transported away by a vapor movement.

For process control, it may be advantageous to bring substrate 3 and medium 7 to the same temperature or different temperatures. This may advantageously be implemented by heating elements under substrate 3 and with a separately arranged medium reservoir.

In order to determine the endpoints of the complete vapor exchange, level measurement of the vapor level is advantageously used. According to FIG. 3, the level can be measured:

- by measuring the thermal conductivity at miniaturized resistors 15 of a Wheatstone measuring bridge circuit 16 which are applied, at various heights, to the inside of trough 6; or
- for greater precision, with the assistance of a light source 10, utilizing the total reflection at the transition to the denser medium; or
- by evaluating the dual-beam interference.

Dual-beam interference occurs when light beam 11 emanating from a light source 10 is partially reflected at the vapor layer and partially penetrates into the vapor layer, and is then reflected at the lower edge of the vapor layer, namely, at the bottom of trough 6 or on substrate 3, and upon emerging, interferes with the light beam reflected at the surface. The interference pattern is formed by superposition of light beams 12, for example with the aid of a lens 14, on a detector 13 or screen placed in its focal plane. The thickness of the vapor layer can then be inferred from the intensity profile of the interference pattern. When measuring by total reflection and when evaluating the interference intensity, a line-scanning camera with computer read-out is advantageously used as a spatially-resolving detector 13.

Figure 3:
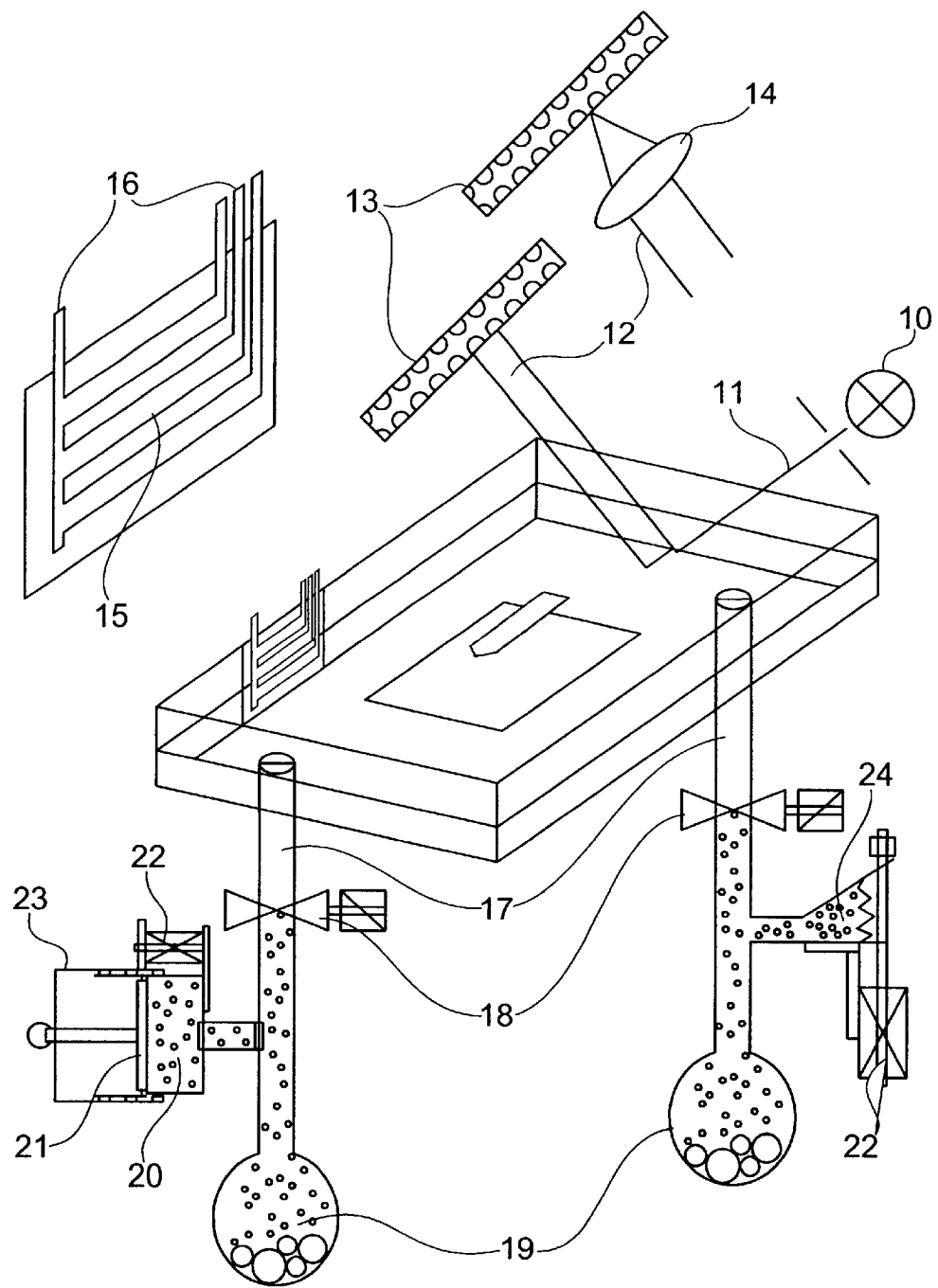
FIG. 3 shows arrangements for regulating the level and for changing the media in order to carry out the method according to the present invention with a scanning probe microscope.

To accelerate the vapor-feed process, it is advantageous—as shown in FIG. 3—to provide at least one reservoir 19 for the medium on trough 6. For this purpose, a compensating vapor quantity 20 is conveyed to or from trough 6 via a tube 17 and a valve 18 with the aid of a piston 21 which is actuated in a cylinder 23 by a positioning motor 22. In this context, the valve setting, the piston position and the temperature of substrate 3 may advantageously be adjusted by computer control. Using this device, or a similar compensating-volume control which, according to FIG. 3, is constructed with a bellows 24 and a positioning motor 22, the vapor for the deposition or for the etching can be controlled and can be removed and supplied rapidly, and it is also possible to change from one medium 7 to other media 7.

Figure 4:
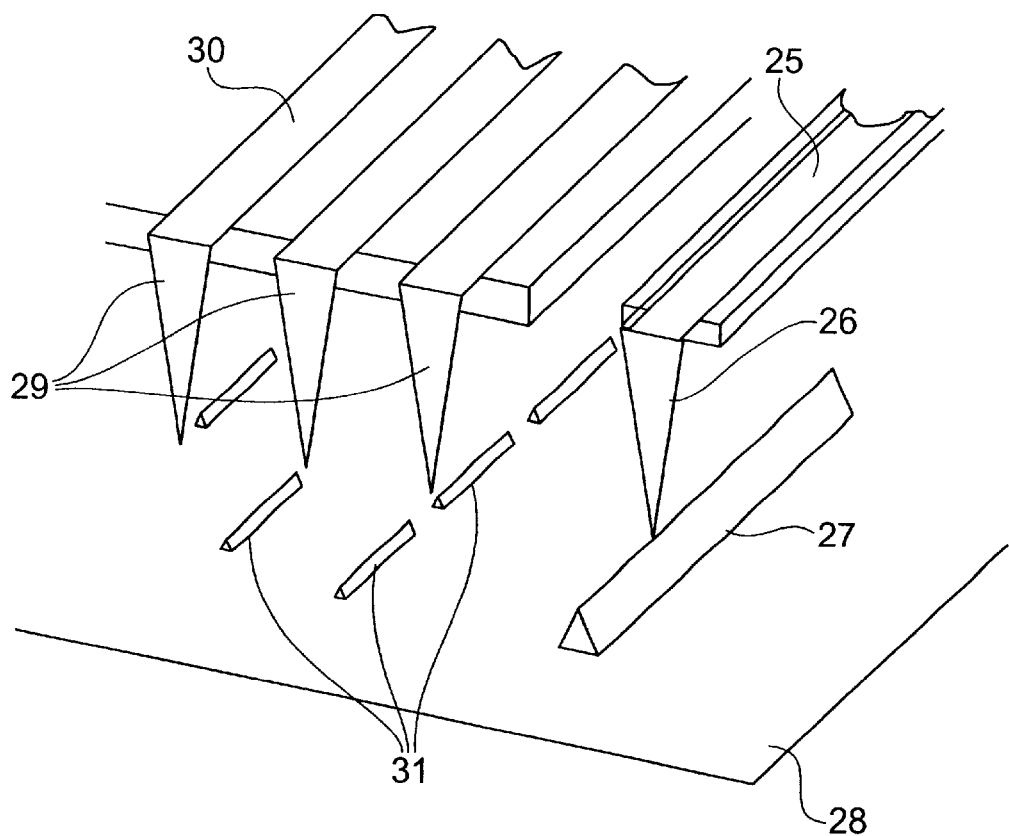
FIG. 4 shows an arrangement having a plurality of microtips and a test tip for implementing the method according to during deposition or etching on larger structure fields and for the three-dimensional construction of nanostructures.

In the arrangement shown in FIG. 4 for carrying out the process on larger structure fields and for three-dimensional construction of nanostructures, a plurality of microtips 29 that can be addressed independently via separate conductor tracks 30 are used. This allows separate driving, for example, in order to achieve a two-dimensional pointwise structured application 31 and etching in writefields on a substrate 28, with simultaneous guiding by a microtip 26 which is driven in read mode using a conductor track 25 and with which, for example, a predetermined trace 27 is tracked by real-time signal evaluation and position correction. For example, using a square tip array having 100 separately addressable and readable microtips 29 that are arranged in a fixed or variable grid dimension, deposits structured in one position can thus be produced simultaneously.

In order to fabricate such microtips using the process of nanolithography with deposition in a particle-beam instrument, separately addressable microtips with 100 nm spacing may be constructed in a line array and even in a square array. Since the ion-emitting microtips are formed from the Taylor cone of water at the end of the presented tip, the presented microtips establish only the location of the deposition by their position. By setting the voltage it is possible, even with microtips that are at the same voltage, to deposit and reproduce the pattern of the distribution of the microtips in question with their spacings. It may sometimes be necessary, for each microtip, to build a resistor that limits the emission current into the base of the microtip in order to make it possible for all the microtips to emit ions uniformly at the same voltage.

A tip array fabricated in this manner can advantageously be used for the production of photonic crystals and further lattice-like structures, such as computer-generated holograms.

For the storage of information, the limiting frequency of the cantilever at 10 kHz signifies a possible read rate of 1 Mbit/s. If one information unit is deposited in 0.1 ms, then this is also the write rate of the arrangement. At present, 1 ms is required as the deposition time. Therefore, a write rate of 100 Kbit/s can be achieved for the storage of information.

Using the process according to the present invention, it is also possible to remove material by etching. This is advantageous for cleaning the substrate surfaces and microtips that are to be coated, as well as for removing materials already deposited. For example, by virtue of the fluorine contained, xenondifluoride etches silicon in response to ion excitation and produces gaseous etching products.

Figure 5:
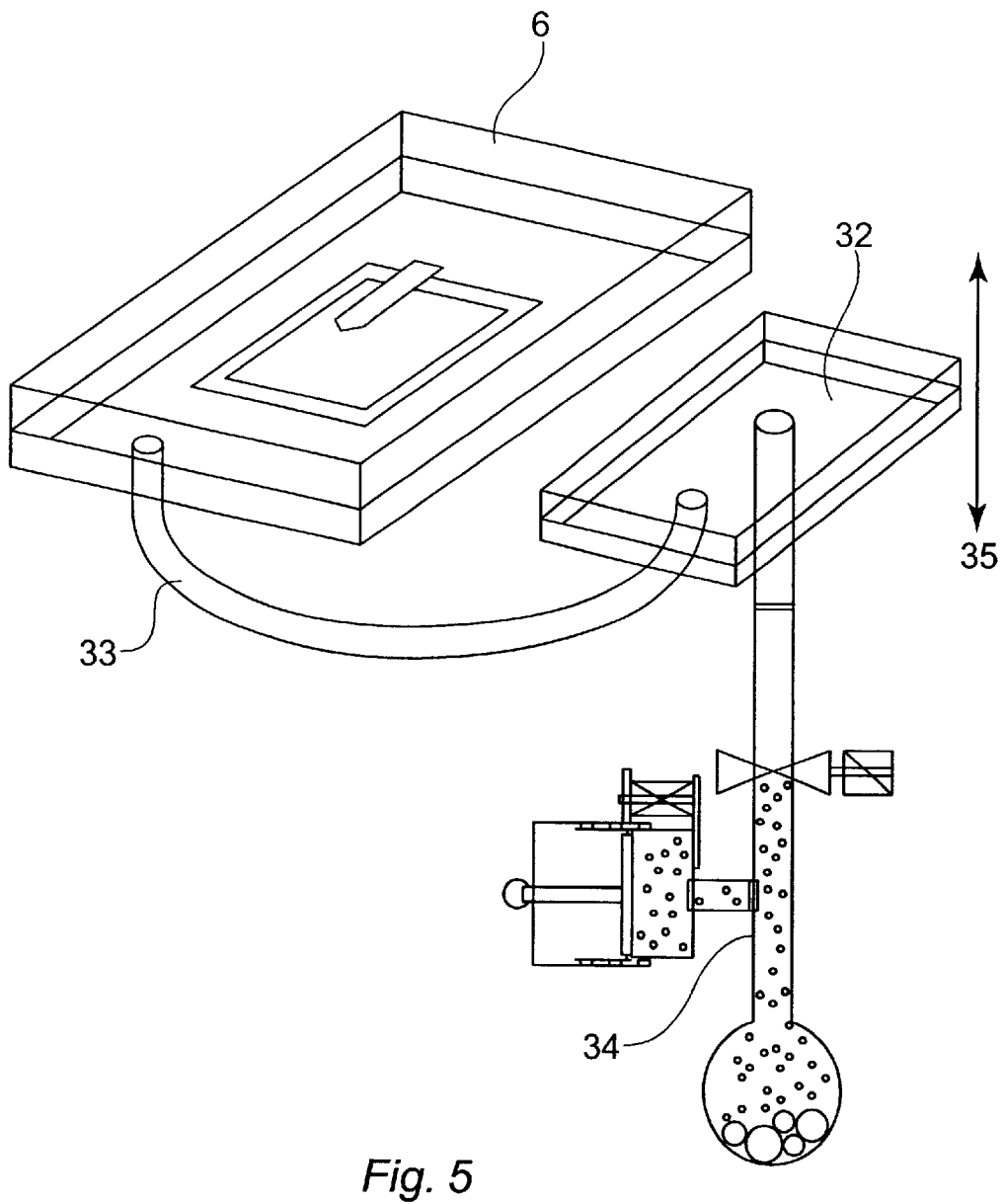
FIG. 5 shows an arrangement for regulating the level and for changing the media in order to carry out the process of the present invention when etching with a scanning probe microscope.

An arrangement which is suitable for etching and is operated at atmospheric pressure is shown in FIG. 5. As a result of a suitable gas-vapor guidance and the use of a further trough 32, which is connected via a flexible connecting tube 33 to trough 6 of the scanning probe microscope and can be adjusted relative to it in the indicated direction of motion 35, the etching gas flows through the connecting tube, depending on the difference in level between trough 6 and trough 32, and thus moves the vapor surrounding the microtip. Consequently, the etching products are moved away from the microtip. The connected compensating piston 34, with reservoir and valve, makes it possible to supply or remove the etching-gas components in order for the etching process to be terminated and to be carried out with computer control.

With this arrangement, which is equipped with a level measurement device (not shown in the drawing) and which can be operated with computer control, it is possible to achieve material transport of the reaction products by vapor flow during the etching of the substrate or the microtips. Besides the aforementioned xenondifluoride vapor, those solid etchants which have a high vapor pressure and contain heavy atoms are also suitable as the etchant.

Figure 6:
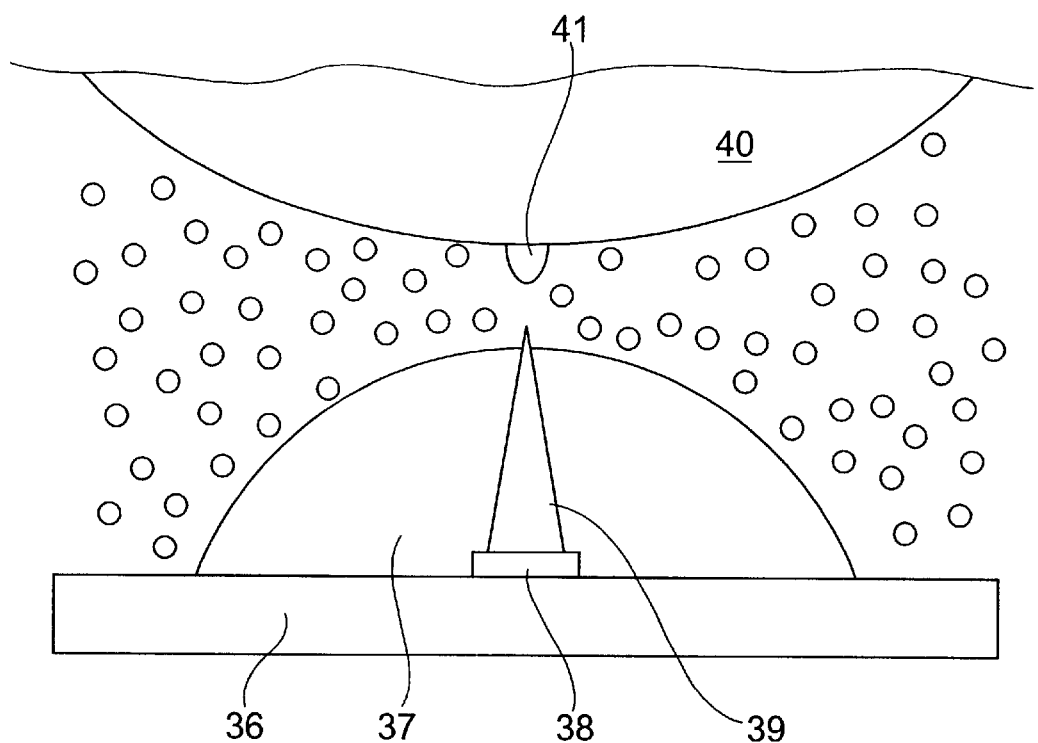
FIG. 6 shows the working arrangement for in-situ repair of a microtip of a scanning probe microscope.

The working arrangement shown in FIG. 6 for in-situ repair of a microtip of a scanning probe microscope shows a presented microtip 39 contacted by a conductor track 38. Conductor track 38 is located on a substrate holder 36. Microtip 39 is surrounded by a high-impedance proximity deposit 37 which makes it possible to regulate the highest point of microtip 39. To produce a new microtip, a working tip 40 is brought to rest over this point and a tip 41 is put on working tip 40 using a short pulse. Using this new tip 41, microtip 39 is then re-scanned and the process is repeated with a change in the pulse length, the voltage, the vapor pressure and the vapor composition by changing the partial pressure and the material composition of the medium until the desired fine or coarse tip radius has been produced on tip 41.

The process according to the present invention can also be used to store information by depositing molecules and molecular clusters and for erasing information by removing or restructuring molecules with the assistance of a single microtip or by a multitip arrangement. In this case, the microtips are guided locally by an additional test tip. Reading takes place using the same microtip, but at a voltage below the reaction threshold for writing or erasing. The microtip arrangement for the multitip write, read and erase technology can be produced internally by deposition lithography. In addition, the write-read-erase head can be repaired in situ with this process, and it can be routinely tested and repaired in preprogrammed fashion in order to maintain the performance of the write-read-erase memory device.

Figure 7:
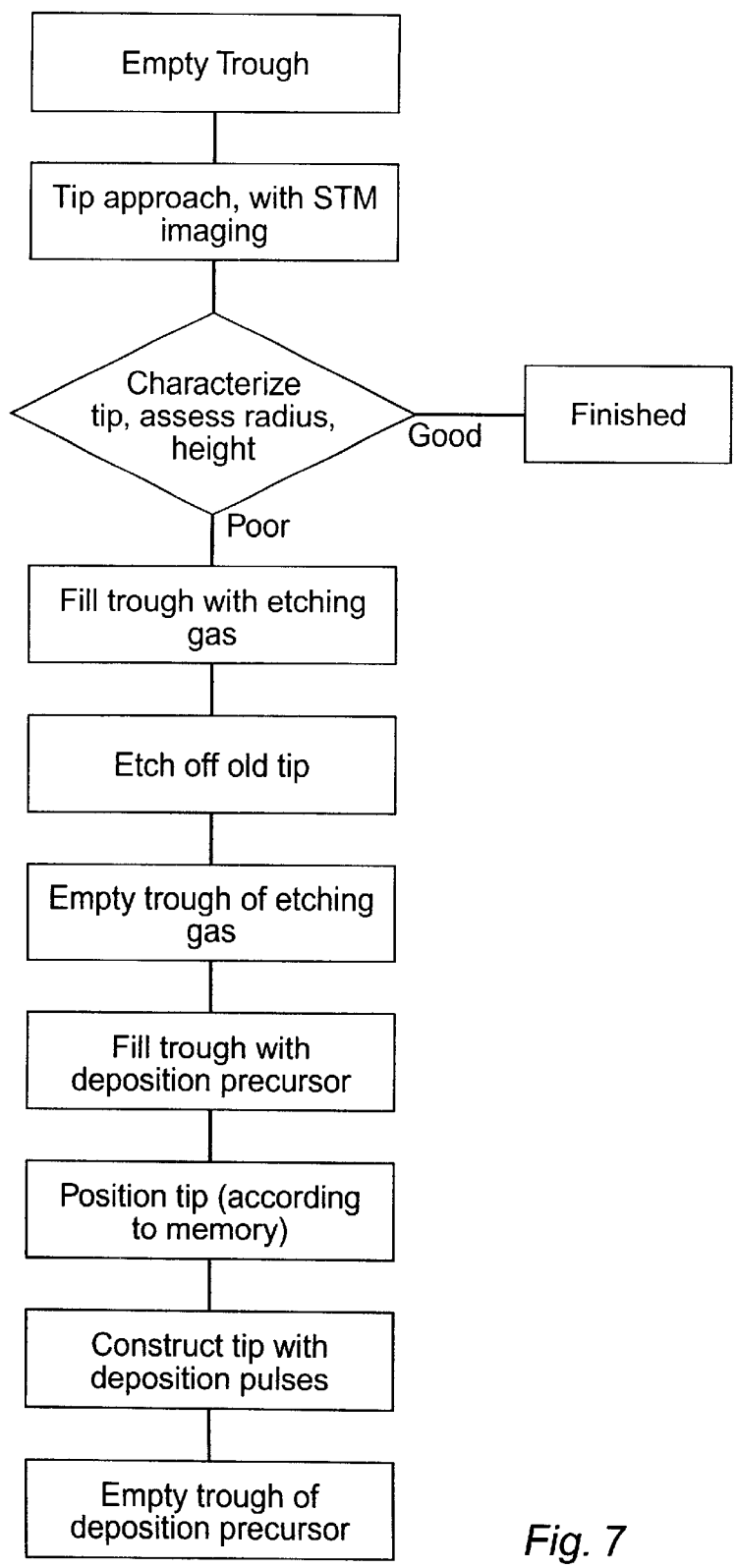
FIG. 7 shows a flow chart of the working stages for the characterization of microtips and for the repair of a write-read-erase head of an information storage device that works on the basis of the method according to the present invention.

FIG. 7 shows the flow chart for the automatic functional sequence of characterization and repair for a write-read-erase head on a data storage device, which operates on the basis of the process according to the invention. First, an empty trough is provided, as shown in block 102. Then, the tip is approached to the trough, using STM imaging, as shown in block 104. The tip is characterized, including assessing the radius and the height, as shown in decision block 106. If the tip is judged in block 106 to be good, then the process is finished, as shown in block 108. If the tip is judged in block 106 to be poor, then the process continues with filling the trough with etching gas, as shown in block 110. The old tip is then etched off, as shown in block 112. The trough is next emptied of etching gas, as shown in block 114, and filled with deposition precursor, as shown in block 116. The tip is positioned according to memory, as shown in block 118. The tip is constructed with deposition pulses, as shown in block 120. The trough is then emptied of deposition precursor, as shown in block 122.

What is claimed is:

1. A method for applying or removing a material to and from a substrate using a scanning probe microscope operated at atmospheric pressure, the scanning probe microscope including at least one microtip, the method comprising:
   placing the substrate in a trough disposed on an x-y table of the scanning probe microscope;
   filling the trough with a gaseous medium to a level value so that a top side of the substrate is covered with a thin layer including at least one monolayer of the medium;
   dipping at least one of the at least one microtip into the thin layer; and
   applying an electric voltage or voltage pulses to the microtip.

2. The method as recited in claim 1 wherein the scanning probe microscope includes at least one of a scanning tunneling microscope, a scanning force microscope and a scanning near-field microscope.

3. The method as recited in claim 1 wherein the applying of the electric voltage or voltage pulses is performed so as to deposit a structured precipitate from the gaseous medium or to perform a structuring etching of the a surface of the substrate.

4. The method as recited in claim 1 wherein the gaseous medium includes at least one of an organometallic compound, an inorganic compound and an organic compound.

5. The method as recited in claim 4 wherein the organometallic compound includes at least one of $Me_2Au(tfac)$, $Me_2Au(hfac)$, $Me_2Au(acac)$, $CpPt(CH_3)_3$, $Mo(CO)_6$ and $Cu(hfac)_2$.

6. The method as recited in claim 4 wherein the inorganic compound includes at least one of $TiI_4$, and $TiCl_4$.

7. The method as recited in claim 4 wherein the applying or removing of the material includes an etching and wherein the gaseous medium includes at least one of $XeF_2$, $TiI_4$, $TiCl_4$, $WF_6$, other highly fluorinated and other halogenated compounds.

8. The method as recited in claim 1 wherein the filling is performed in a quantitatively controlled manner.

9. The method as recited in claim 8 wherein the quantitatively-controlled filling is performed using a weight and density difference between ambient air and the gaseous medium so that the ambient air in the trough forms a lower layer in response to the filling, the gaseous medium having a greater molecular weight than the air.

10. The method as recited in claim 8 wherein the quantitatively-controlled filling is performed using a pump and a controlled valve.

11. The method as recited in claim 1 further comprising monitoring a level of the gaseous medium using at least one of thermoelectric sensor array, a total reflector and a reflection interferometer, the total reflector including a linear detector, the reflection interferometer including a light source, a beam guide, a line detector and evaluation electronics.

12. The method as recited in claim 1 wherein the applying or removing of the material includes producing a structured precipitate or a performing a structuring etching and further comprising changing the gaseous medium during the producing of the structured precipitate or during the structural etching.

13. The method as recited in claim 1 wherein a structure etching is performed and further comprising removing from a surface of the substrate, using a rinsing medium, etching products produced during the structuring etching.

14. The method as recited in claim 1 wherein the scanning probe microscope includes a probe cantilever and wherein the at least one microtip includes a plurality of microtips, the plurality of microtips being included on the probe cantilever, and wherein the applying or removing of the material includes at least one of an application or removal of a large structure field and a three-dimensional construction of a nanostructure, a simultaneous use of each microtip of the plurality of microtips being ensured using a resistor included in each of the plurality of microtips or an active current control of each of the plurality of microtips.

15. The method as recited in claim 14 further comprising using a test tip for at least one of:
   position guiding of the cantilever probe during the application or removal of the material;
   observation of the large structure field; and
   the three-dimensional construction of the nanostructure.

16. The method as recited in claim 1 wherein the scanning probe microscope includes a probe cantilever and wherein the at least one microtip includes a plurality of microtips, the plurality of microtips being included on the probe cantilever, and wherein the applying or removing of the material includes a characterization of the geometry of the plurality of microtips and wherein a presented tip electrically contacted to a conductor track is disposed in the trough on a second substrate, and further comprising using the presented tip to scan the geometry of the first microtip using scanning microscopy.

17. The method as recited in claim 1 wherein the scanning probe microscope includes a probe cantilever and wherein the at least one microtip includes a plurality of microtips, the plurality of microtips being included on the probe cantilever, and wherein the applying or removing of the material includes a restoration or a production of a first microtip of the plurality of microtips and wherein a presented tip electrically contacted to a conductor track is disposed in the trough on a second substrate, and further comprising restoring or producing the first microtip by supplying an electric voltage or voltage pulses to the presented tip so as to deposit a precipitate from the gaseous medium onto the probe cantilever.

18. The method as recited in claim 1 wherein the applying of material includes applying molecules or molecular clusters to the substrate so as to store information, the molecules or molecular clusters being suitable as information carriers, and wherein the removing of the material includes removing or restructuring the molecules or molecular clusters so as to erase the information, and further comprising detecting the molecules or molecular clusters so as to read the information.

19. The method as recited in claim 18 wherein the at least one microtip includes a plurality of microtips and further comprising at least one of using, repairing and cleaning the plurality of microtips in a same but mutually independent way during at least one of the storing, erasing and detecting of the information.

* * * * *